United States Patent [19]

Takahashi

[11] Patent Number: 4,750,120
[45] Date of Patent: Jun. 7, 1988

[54] CASH REGISTER SYSTEM WHICH ADJUSTS THE DATE OF SALES

[75] Inventor: Hiroshi Takahashi, Tokyo, Japan

[73] Assignee: Casio Computer Co., Ltd., Tokyo, Japan

[21] Appl. No.: 578,699

[22] Filed: Feb. 9, 1984

[30] Foreign Application Priority Data

Feb. 16, 1983 [JP] Japan ............................... 58-22889

[51] Int. Cl.⁴ ............................................ G06F 9/00
[52] U.S. Cl. .................................................. 364/405
[58] Field of Search ................ 364/405, 465, 200, 900

[56] References Cited

U.S. PATENT DOCUMENTS

| | | | |
|---|---|---|---|
| 4,138,733 | 2/1979 | Takakuma et al. | 364/405 |
| 4,186,439 | 1/1980 | Shimura et al. | 364/405 |
| 4,310,890 | 1/1982 | Trehn et al. | 364/464 |
| 4,424,567 | 1/1984 | Yasutake | 364/405 |
| 4,425,619 | 1/1984 | Matsuda et al. | 364/405 |
| 4,442,492 | 4/1984 | Karlsson et al. | 364/464 |
| 4,484,277 | 11/1984 | Uesugi | 364/405 |
| 4,503,503 | 3/1985 | Suzuki | 364/405 |

FOREIGN PATENT DOCUMENTS 57-41758 12/1982 Japan .
58-114157 8/1983 Japan .

Primary Examiner—Gareth D. Shaw
Assistant Examiner—John G. Mills, III
Attorney, Agent, or Firm—Pennie & Edmonds

[57] ABSTRACT

A cash register system has a memory for storing the present time data counted by a time counting circuit and the present date data, and a memory for storing date changing data indicating a changing range of a data changing time with respect to a date renewal time on a calender day. When all the sales data are read out from a total memory and calculated in a total manner, the present time data and the date changing data, which are read out from the said memory means by a CPU, are compared with each other. When the former is not within the latter, the present time data is output as the date data of total calculation data. On the other hand, when the former is within the latter, the present date data is modified to have another date data, and the latter data is output as the date data for total calculation data.

8 Claims, 4 Drawing Sheets

CASH REGISTER SYSTEM WHICH ADJUSTS THE DATE OF SALES

BACKGROUND OF THE INVENTION

The present invention relates to improvements of a cash register system.

In a network of electronic cash registers, the electronic cash registers (i.e., terminal devices) installed in branch offices or stores are connected by a telephone line or the like to a host computer installed in a head office or a data collection center. After each store is closed, all sales made on the day are totalled. The total sales data is sent to the host computer. Usually, the date data showing the day is attached to the total sales data.

In a 24-hour store or a late night store, the sales made after midnight may be added to the total of the sales made on the preceding day. In this case, when the total of sales is calculated after midnight, date data representing the present day, not the preceding day, is automatically attached to this total sales data. This date data is sent to the host computer together with the total sales data. If another store with a cash register connected to the host computer closes before midnight, the date data sent to the host computer together with the total sales data represents the previous day. As a result, some of the items of data supplied to the host computer bear the preceding date, while the others bear the actual date. This will cause a confusion on the part of the host computer in calculating the grand total of sales made on the preceding day. Therefore, a data processing system has been demanded, which can attach the preceding date to the total sales data even if some of the sales are made after midnight.

A store with a cash register connected to the host computer may open from 7:00 AM till 2:00 AM of the following day. In this case, data showing the following day is attached to the data representing the total of the sales made from 7:00 AM to midnight, as well as to the data representing the total of the sales made after midnight till 2:00 AM. This is because the sales are totaled after 2:00 AM.

Thus, it has been desired that the date data be attached to the total sales data showing the sales, some of which are made on the day shown by the date data and the others of which are made on the preceding or following day.

SUMMARY OF THE INVENTION

Therefore, the object of the present invention is to provide a cash register system which can attach date data to the total sales data representing the sales, some of which are made on the day represented by the date data and the others of which are made on the preceding or following day.

According to the present invention, there is provided a cash register system comprising time counting means for counting a present time data and a present date data, first memory means connected to said time counting means for storing said present time data and said present date data, pre-programmed second memory means for storing date changing data indicating a changing range of a date changing time based on a date renewal time on a calendar, date data changing means connected to said first and second memory means for detecting if the present time data falls within the changing range, and changing said present date data to another date data when said present time data is within said changing range, and outputting means connected to said date data changing means and for outputting said present date data as the date data for total calculation if the present time data falls outside said changing range at the time of total calculation of all the sales data and outputting said another date data as the date data for the total calculation if the present time data is within said changing range.

The cash register system according to the present invention can attach the same date data to the total sales data to be sent from the cash register installed in any branch store to the host computer of the main office, even if some of the sales are made on the day preceding or succeeding the day represented by the date data. The host computer can therefore calculate the grand total of the sales made at the branch stores for the same sales date. Further, a part of the business time band of the data before or after one business day can properly be set up. Therefore, the same date data of one day can be applied to the total calculation data containing the sales data occurring on the different days containing the business day when the branch stores have different business time bands. In this way, it is ensured to use the same date data for the total calculation data collected from different branch stores.

DETAILED DESCRIPTION OF THE PREFERRED EMBODIMENTS

Figure 1:
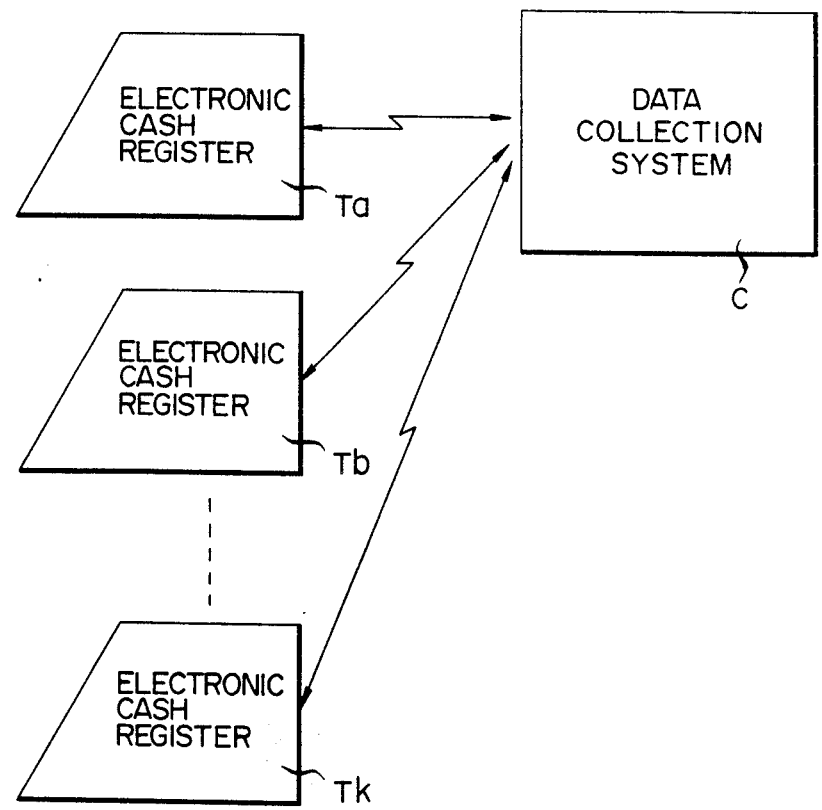
FIG. 1 is a schematic illustration of a cash register system, which is constructed on the on-line basis.
Figure 2:
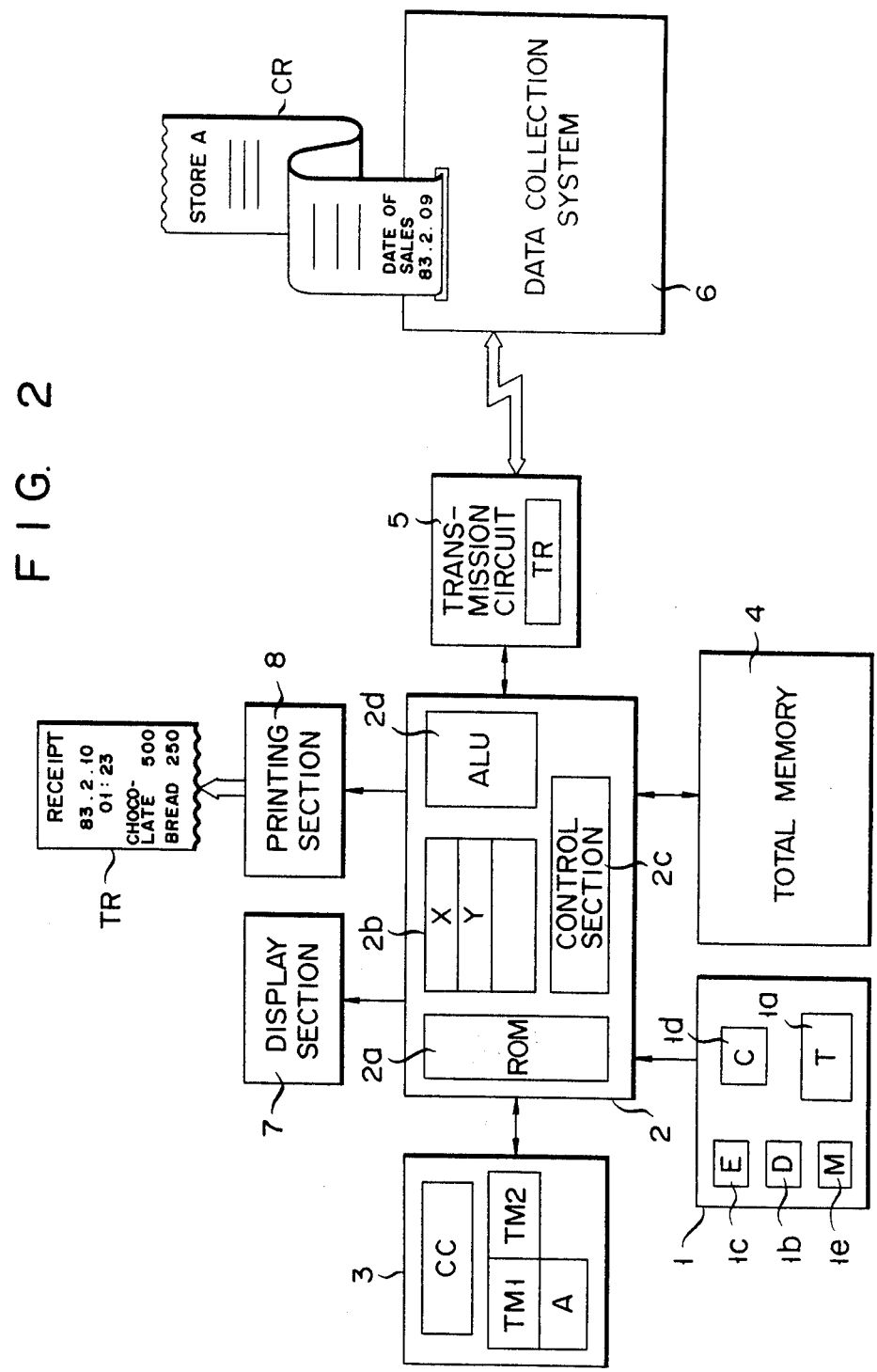
FIG. 2 is a block diagram showing a cash register system which is an embodiment of the present invention.

Some preferred embodiments of the present invention will be given referring to accompanying drawings. This embodiment is a data processing system constructed on an on-line basis, as shown in FIG. 1. As shown, a plurality of terminal equipments as electronic cash registers Ta, Tb, ..., Tk installed in respective stores are coupled, by means of telephone lines, for example, with a host computer as a data collection system installed in a data collection center. A circuit arrangement of each electronic cash register is illustrated in FIG. 2.

An input section 1 of the electronic cash register is provided with total calculation keys 1a, in addition to a depatment key 1b, data entry keys 1c, a customer key 1d, and a mode switch 1e. The data keyed in by key operations of the related keys in the input section 1 is input to a central processing unit (CPU) 2. The CPU 2 has a read only memory (ROM) 2a for previously storing various microinstructions, a random access memory (RAM) 2b having various types of registers such as an X register and a Y register, a control section 2c for controlling various operations in this device, and an arithmetic logic unit (ALU) 2d. The CPU 2 is bidirectionally interconnected with a time counting circuit 3, a total memory 4, and a transmission circuit 5. The time counting circuit 3 has a time memory section TM1 for storing time data, e.g., second, minute, and hour of the 24 hours system, a date memory section TM2 for storing the date data, e.g., day, month, and year, and a counter cc for counting a reference clock signal at a predetermined frequency, and reading out the time data and the date data every second to add 1 to the second data. The time counting circuit 3 is provided with an A register for storing the data of a predetermined time width. For loading the time width data into a A register, the mode switch 1e is set to a preset mode and the data entry key is operated. Upon those key operations, the time width data is loaded into the A register, via the CPU 2. Stored into the total memory 4 are the sales data keyed in by the data entry key 1c. Then, those sales data are classified, by the department key 1b and the client key 1d, into department groups and client groups, and are totallized for each group. Finally, the totallized data are stored in the memory 4. The transmission circuit 5, containing a transfer buffer TR, transfers to the CPU 2 a data transfer request signal from the data collection system 6 installed in the data collection center. In response to the operation of the total calculation key 1a, the transmission circuit 5 transfers the total calculation data read out from the total memory 4 through the CPU 2 to the data collection system 6. The data collection system 6 receives the data successively transferred from the transfer buffer TR in the transmission circuit 5, totallizes the data, and prints the data on a record sheet $C_R$. The sales data keyed in by the operation of the data entry key 1c through the CPU 2 is transferred, every time it is inputted, to a display section 7 where it is electro-optically visualized, and also to a printing section 8 where it is printed on a record sheet $T_R$.

Figure 3:
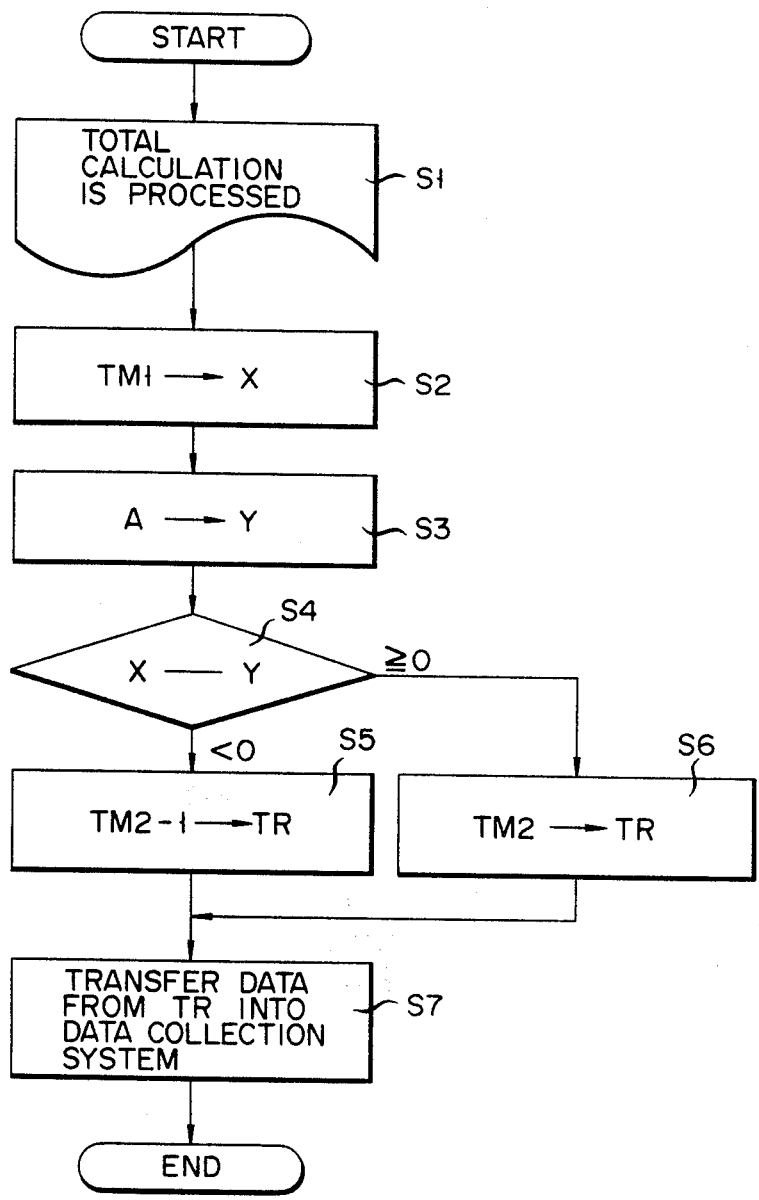
FIG. 3 is a flow chart illustrating a sequence of the operations of the cash register system shown in FIG. 1.

In operation, at the end of the business work day, the sales data are totalized to prepare the total calculation data on that day. To effect this, the total calculation keys 1a, after the mode switch 1e is set to the total calculation mode, is depressed, and then the electronic cash register starts to operate according to a sequence as shown in FIG. 3. In a step S1 for the processing of the total calculation, the data in the total memory 4 is transferred, by the CPU 2, to the transfer buffer TR in the transmission circuit 5, which then successively transmits the data to the data collection system 6. After the completion of the data transfer from the total memory 4, the data in the total memory 4 is cleared.

Following the total calculation processing, in the next step S2 and the subsequent ones, the date of the total calculation is computed using the various data stored in the time counting circuit 3. The total calculation data computed is then transmitted to the data collection system 6. More specifically, in step S2, the present time is read out from the time memory section TM1 of the time counting circuit 3, and is transferred to the X register in the CPU 2. In step S3, the time width data is read out from the A register in the time counting circuit 3 and is transferred to the Y register in the CPU 2. The contents of the X register and the Y register are compared with each other in the next step S4. By this comparison, it is judged whether the result of subtraction of the contents of the Y register from that of the X register is positive or negative. For example, if the time width data preset in the A register is 7 hours, the following result is obtained since one day consists of 24 hours. The result of subtraction of the 7 hours from the present time is negative when the present time is in the range from 12:00 midnight to 6:00 AM. This indicates a situation that the total calculation is made on the day after the time that the calender day begins again, viz. 12:00 midnight. In this case, the operation advances to the next step S5. In this step, "1" is subtracted from the contents of the date memory section TM2 to have the date of the previous day. The previous day data is then applied as the total calculation date day to the transfer buffer TR. On the other hand, when the substraction result is positive, this indicates a case that the total calculation is conducted between 7:00 and 12:00. In this case, the operation proceeds to step S6. The present date stored in the date memory TM2 is transferred as it is to the transfer buffer TR, in the form of the data with the total calculation date. Then, in the next step S7, the data with the total calculation date is then transferred to the data collection system 6.

In this way, in a total calculation mode, the date of the total calculation is calculated using the data of the present time and the time width, which are read out from the time counting circuit 3. The date data is then applied to the data collection system 6. In other modes than the total calculation mode, for example, in a registration mode where the mode switch 1e is set to the registration mode and the sales data is keyed in, the present time and the present date are read out from the time counting circuit 3 and are printed on the record sheet $T_R$ in the electronic cash register. Then, the record sheet P bearing the present time and date printed thereon is handed to the customer. Therefore, in a late-hour open store, even if 01:23, Feb. 10, '83 is printed on the sheet $T_R$ in the registration mode, as shown in FIG. 2, the record sheet $C_R$ of the data collection system 6 is printed with Feb. 9, '83. This is because, in the total calculation mode following the registration mode, the total calculation date data is transmitted to the data collection system 6.

Thus, according to the present embodiment, it is possible to use for the reference time for renewing the total calculation date a time shifted from the renewal time of the present date by a predetermined time width preset in the A register. This implies that the renewal time for the total calculation date can optionally be set according to the business hours of each store. Specifically, in a store opening from 7:00 to 2:00 on the next day, for example, when it is desired that the sales data on the next day up to 2:00 are also total calculated together with the sales data on the previous day, i.e., from 7:00 to 24:00, 7 hours for the time width data is set in the cash register. With this preset, the sales data occuring during from 0:00 to 7:00, when the total is calculated, are transferred, together with the date data of the previous day. Upon receipt of the data, the data collection system 6 totalized such data as the data of the previous day. The sales data occurring during the time band from 7:00 to 24:00, when the total is calculated, are transferred together with the present day data. As described above, even when the sales data totals are calculated any time in the business time band of the store, which partially contains the time band on the next day, the same date data is transferred to the data collection system 6. The store with the business time band from 7:00 to 2:00 on the next day, uses 7 hours for a maximum of the time width data, which is preset in the cash register. The time width may be any one of the hours "2" to "7". Practically, however, there often occurs a situation that many customers are still in the store for their shopping even after the close time of 2:00, and the store cannot be closed. To cope with such situation, it is preferable to preset the 7 hours as the maximum time width in the cash register. Further, for putting the sales data collected up to 6:00 in the total calculation data in the previous day, a 24-hour open store a has 7 hours set for the time width. A store b opening from 7:00 to 23:00 has 7 hours set for the time width. A store k opening from 9:00 to 1:00 has 9 hours set for the time width. Under this condition, if the store a performs the total calculation data at 4:23, the store b does the same at 23:07, and the store k does the same at 0:20, the total calculation data transmitted from those stores to the data collection system 6 have the same date attached thereto.

The above embodiment refers to a case where the sales data collected for some of the extended business hours on the next day is contained in the total calculation data on that business day. It is evident that the sales data collected for some of the business hours on the business day may be contained in the total calculation data on the next business day. In a store opening from 7:00 to 2:00 on the next day, for example, it is often necessary to total calculation sales data occuring during 7:00 to 24:00 as the sales data of the next day. In this case, the time width of 7 hours is preset in the cash register, and in step S4, the calculation of "(X-Y)" is carried out, to effect the subtraction of the time width data from the present time data. When the result of the calculation is 0 or less.

Figure 4:
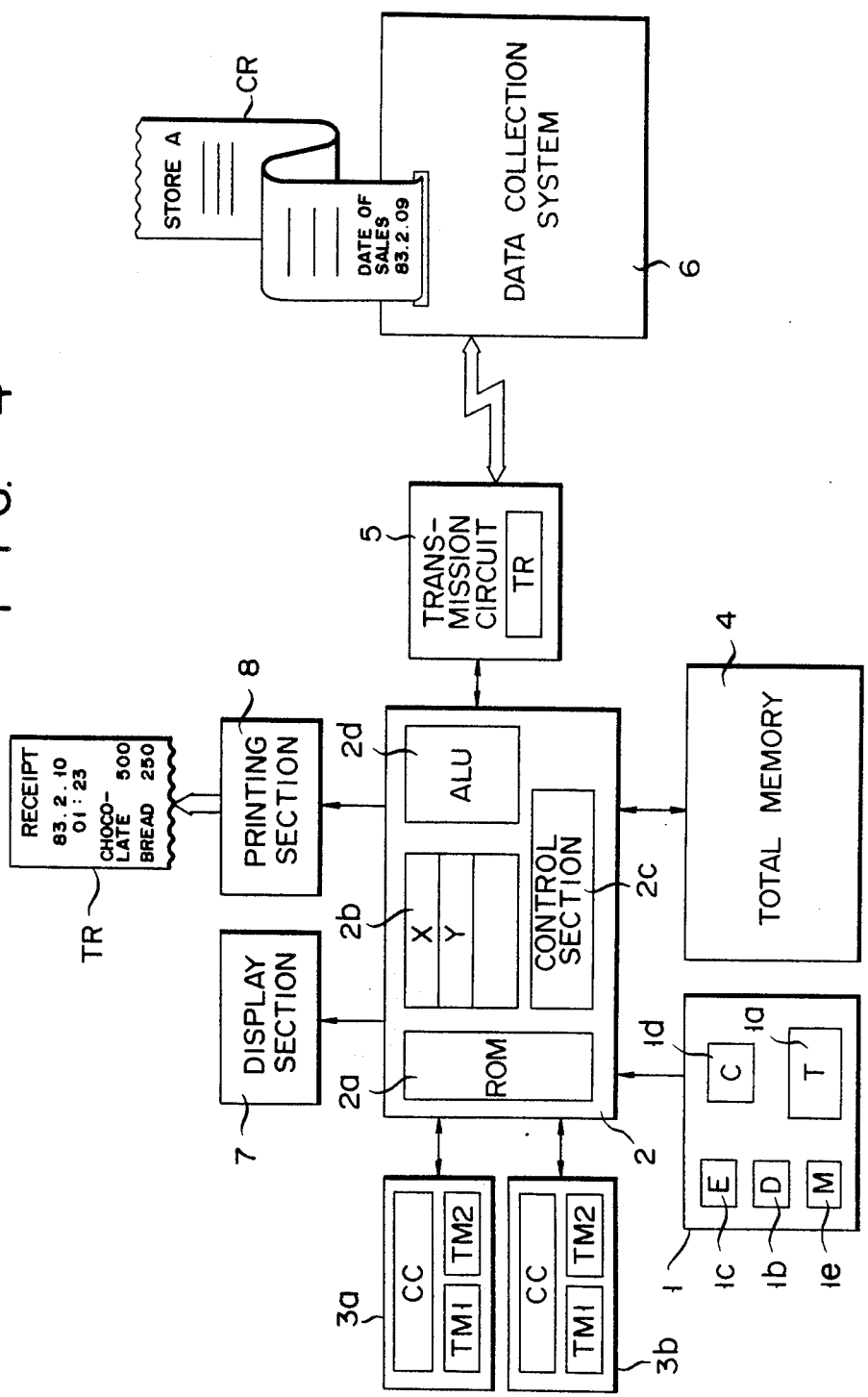
FIG. 4 is a block diagram of another cash register system which is another embodiment according to the present invention.

Step S6 is executed to send the date data on that day in the memory section TM2 to the transmission circuit 5. On the other hand, if the calculation result is greater than 0, step 5 is executed to made the addition of +1 to the date data on that day in the memory section TM2, which indicates the next day data. The next day data calculated is then transferred to the transmission circuit 5. In the embodiment, the total calculation date data is calculated, and is attached to the total calculation data calculated, as mentioned above. Alternatively, a couple of time counting circuits 3a and 3b are provided, while connecting to the CPU 2, as shown in FIG. 4. With this arrangement, the date data corresponding to the total calculation data derived from the time counting circuit 3b is directly output as the total calculation date data. In this case, the time counting circuit 3a stores the exact present date data. The time counting circuit 3b stores a time shifted by a predetermined time width set up allowing for the business hours of that store. For this time setting, the mode switch 1e is set to the preset mode, and the ten key is operated. For example, in the above example, the time set in the time counting circuit 3b is delayed 7 hours behind the exact time in the time counting circuit 3a. For putting the sales data occurring during the time band 0:00 to 7:00 on the next day in the total calculation date data on the previous day, it is sufficient to transfer the total calculation date data based on the time data in the time counting circuit 3b.

While in the above-mentioned embodiment, the time width data ius preset in the cash register, the time data to renew the date may be preset in place of the above. Further, the above embodiment refers to the total calculation of the sales data and how to obtain the same date for the total calculation data. The data transfer date, when the data is transferred, is also obtained in the above-mentioned manner. Additionally, this is applicable for the outputting of the total calculation data and check data to the printer.

What is claimed is:

1. In a data processing system for use in electronic cash registers comprising:

a time counting means for counting present time data and present date data;

a first memory means connected to said time counting means storing said present time data and said present date data;

a preprogrammed second memory means for storing date changing data comprising a date changing range indicating a period of time in a day during which date data is to be changed;

date data changing means connected to said first and second memory means for detecting if the present time data falls within the date changing range and changing the present date data to another date data when said present time data is within said date changing range; and outputting means connected to said date data changing means for outputting said present date data as the date data for a total calculation of all sales data if the present time data falls outside said date changing range at the time of the total calculation of all sales data and outputting said another date data as the date data for the total calculation of all sales if the present time data is within said date changing range.

2. The cash register system according to claim 1, wherein the date changing data stored in the second memory means is time data.

3. The cash register system according to claim 2, wherein the time data comprises a prescribed period of time which starts at 0:00 a.m.

4. The cash register system according to claim 1, wherein said date data changing means changes said present date data to a date data of the immediately previous day.

5. The cash register system according to claim 1, wherein said date data changing means changes said present date data to a date data of the next day.

6. A cash register system comprising:

a first time counting means for counting a present time data and a present date data;

a second time counting means for counting time data and date data shifted by a predetermined time width with respect to the present time data and date data counted by said first time counting means;

memory means connected to said first and second time counting means for storing said present time data and said present date data counted by said first time counting means, and said shifted time data and date data counted by said second time counting means; and outputting means connected to said memory means to output as the date data used for a total calculation of all sales data, the date data based on said shifted time data and date data counted by said second time counting means at the time of total calculation of all sales data.

7. The cash register system according to claim 1, wherein said outputting means comprises a transfer means for transferring data read out from said memory means, and printing means for printing said data transferred through said transfer means.

8. The cash register system according to claim 6 wherein said outputting means comprises a transfer means for transferring data read out from said memory means, and printing means for printing said data transferred through said transfer means.

* * * * *